United States Patent [19]

Van Niekerk

[11] Patent Number: 4,884,954

[45] Date of Patent: Dec. 5, 1989

[54] TWIN COIL APPARATUS AND ENERGIZING STRUCTURE THEREFOR

[76] Inventor: Johannes W. Van Niekerk, 3 Bouer Street, Fichard Park, Bloemfontein, South Africa

[21] Appl. No.: 342,363

[22] Filed: Jan. 25, 1982

[30] Foreign Application Priority Data

Jan. 30, 1981 [ZA] South Africa ............. 81/0626

[51] Int. Cl.$^4$ ............. F04B 17/04; H02K 33/00
[52] U.S. Cl. ............. 417/417; 318/135; 318/122; 318/134
[58] Field of Search ............. 417/415, 416, 417, 418; 318/122, 123, 125, 129, 130, 132, 134, 135; 310/24, 34, 35

[56] References Cited

U.S. PATENT DOCUMENTS

| 507,946 | 10/1893 | Van Depoele | 417/416 |
|---|---|---|---|
| 750,115 | 1/1904 | Orr | 417/416 |
| 1,833,914 | 12/1931 | Ruben | |
| 1,912,167 | 5/1933 | Anderson | 318/123 X |
| 2,003,647 | 6/1935 | Dillstrom | 318/122 X |
| 2,486,948 | 11/1949 | Hinchman | 310/34 |
| 2,784,363 | 3/1957 | Mosier | 318/134 |
| 2,862,450 | 12/1958 | McDonnell | 417/417 |
| 3,031,970 | 5/1962 | Hoblitzelle | 417/417 |
| 3,162,134 | 12/1964 | Lovell | 318/125 X |
| 3,201,670 | 8/1965 | Myers | 318/125 |
| 3,253,742 | 5/1966 | Sanders et al. | 417/417 |
| 3,293,516 | 12/1966 | Maier et al. | 318/134 X |
| 3,328,656 | 6/1967 | Dotson | 318/130 X |
| 3,740,171 | 6/1973 | Farkos | 318/125 X |
| 3,832,608 | 8/1974 | Mills | 310/35 X |
| 3,846,682 | 11/1974 | Massie | 318/134 X |
| 3,922,589 | 11/1975 | Peckingham | 318/129 X |
| 3,931,554 | 1/1976 | Spentzas | 417/417 |
| 4,019,103 | 4/1977 | Davis et al. | 310/34 X |
| 4,121,124 | 10/1978 | Hunt | 310/27 X |
| 4,122,378 | 10/1978 | Brown | 417/417 |

FOREIGN PATENT DOCUMENTS

| 691016 | 5/1953 | United Kingdom . |
|---|---|---|
| 712422 | 7/1954 | United Kingdom . |
| 718199 | 11/1954 | United Kingdom . |
| 863209 | 3/1961 | United Kingdom . |
| 981217 | 1/1965 | United Kingdom . |
| 981660 | 1/1965 | United Kingdom . |
| 1271490 | 4/1972 | United Kingdom . |
| 1295105 | 11/1972 | United Kingdom . |
| 1410180 | 10/1975 | United Kingdom . |

Primary Examiner—William L. Freeh
Assistant Examiner—Paul F. Neils
Attorney, Agent, or Firm—Lowe, Price, LeBlanc, Becker & Shur

[57] ABSTRACT

An electrical device which includes axially aligned solenoids and a plunger with two cores, each of which is located at least partially in a respective one of the solenoids. A controller, operated by synchronism with the plunger, is used to energize the solenoids alternately so that the plunger is reciprocated relatively to the solenoids by the action of the resulting magnetic field on the cores. The device may be combined with a pump, particularly a piston pump, to provide a compact, efficient pumping unit which may be submersible.

9 Claims, 2 Drawing Sheets

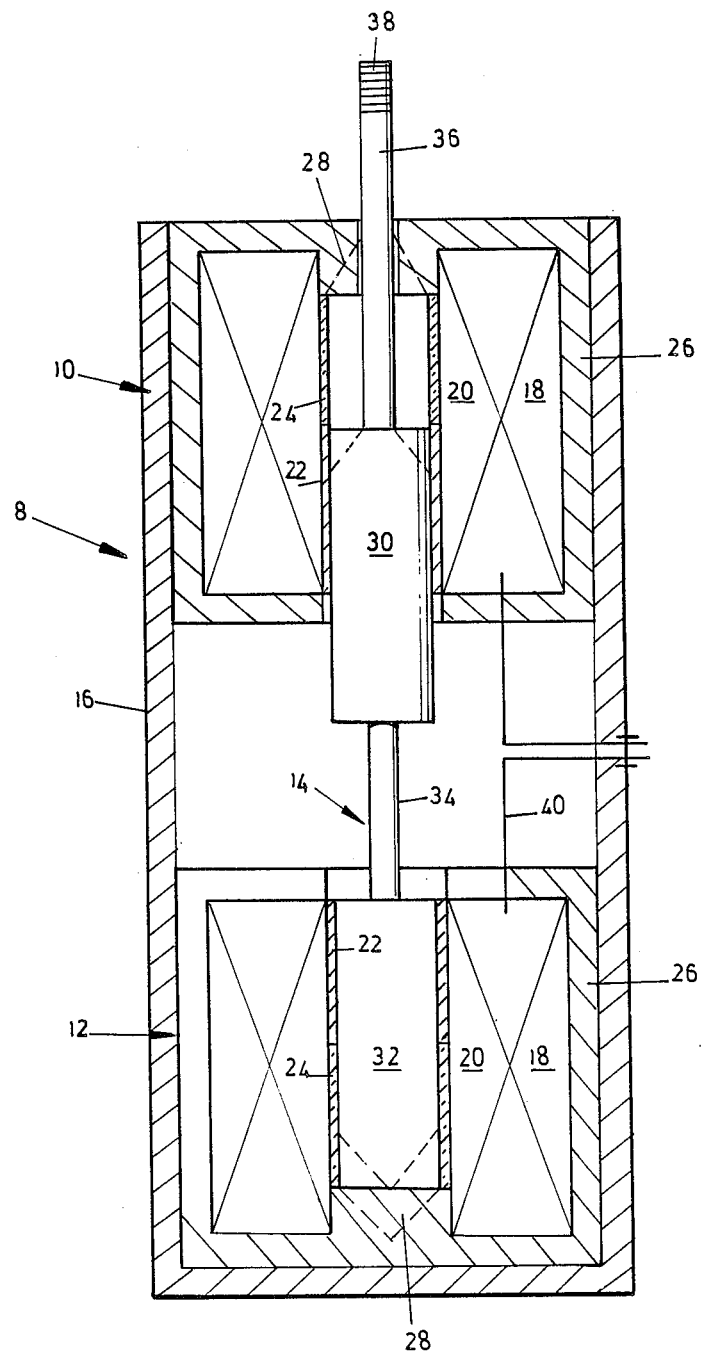
FIG_1

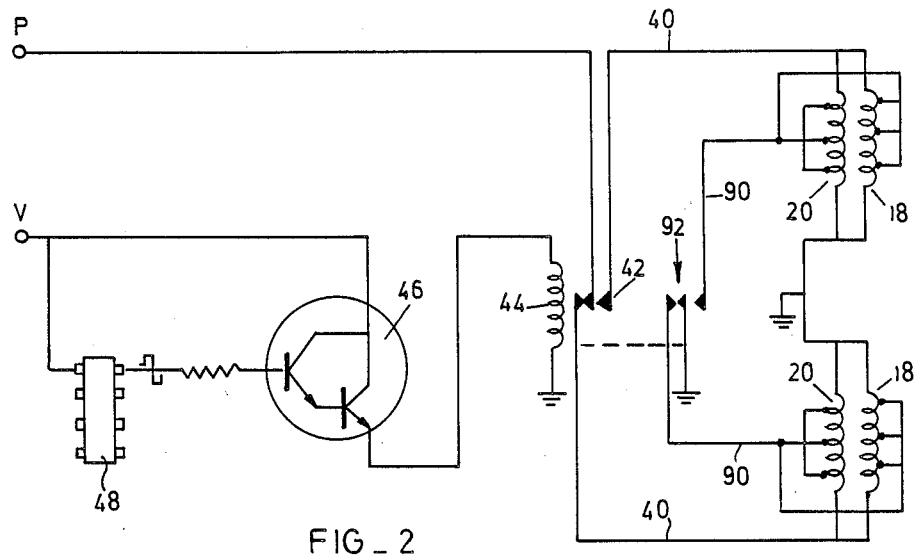
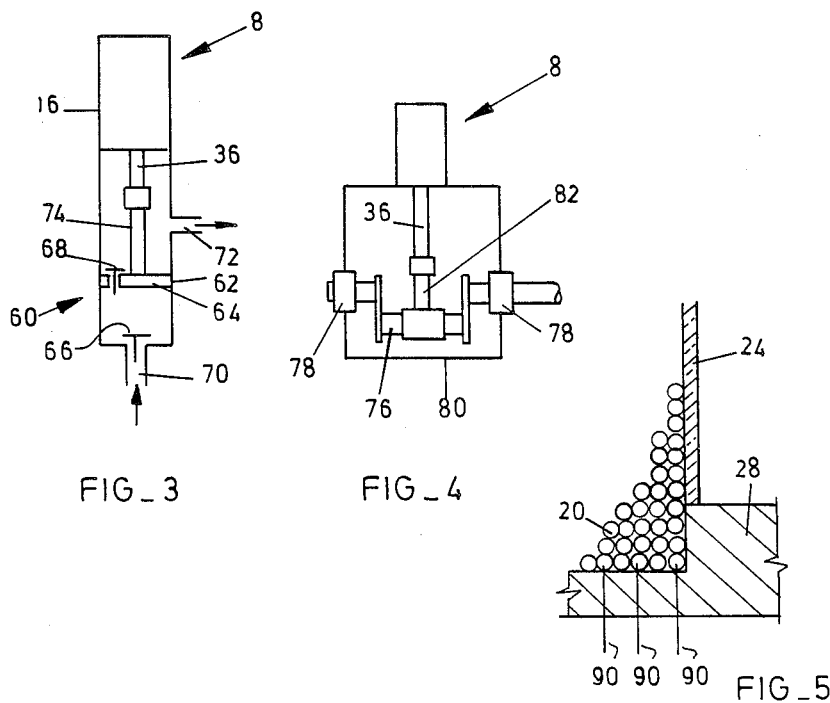

TWIN COIL APPARATUS AND ENERGIZING STRUCTURE THEREFOR

BACKGROUND OF THE INVENTION

This invention relates to an electrical device primarily suited for producing reciprocating motion.

SUMMARY OF THE INVENTION

The invention provides an electrical device which comprises at least two solenoid means, plunger means mounted for relative receiprocating movement between the solenoid means, and control means for repeatedly and alternately energizing the solenoid means with a direct current so that the resulting electromagnetic field which acts on the plunger means causes reciprocating movement of the plunger means relative to the solenoid means. Each of the solenoids includes at least two coils which are connected in parallel for simultaneous excitation by the direct current.

Preferably the solenoid means are spaced and axially aligned and the plunger means has straight line axial movement between the solenoid means.

The length of the stroke of the plunger means may be limited to ensure that the electromagnetic flux is maintained relatively high.

Thus the plunger means may at all times be located at least partly inside each of the solenoid means.

If for example the solenoid means are spaced from one another the plunger means may comprise first and second cores, each located at least partially in the respective solenoid means.

Each solenoid means may comprise at least one coil around a former, which may be partly of a magnetic material.

To increase the flux of the magnetic field produced by the coil use may be made of one or more additional coils around the former connected in such a way that the respective magnetic fields are in the same sense. The coils may be connected electrically in series or preferably in parallel.

The coil or coils may be enclosed at least partially in a housing of a magnetic material.

The device of the invention may, through mechanical movement of the plunger means, be used to generate electricity. It is, however, very well suited for the production of reciprocating movement of a desired stroke length and at a selected frequency.

In this form of the invention the device may be particularly advantageously employed to drive a reciprocating pump e.g. a borehole pump and the invention is intended to include a combination of this type with the pump preferably mechanically secured to the device so as to provide a compact unit.

Another aspect, also intended to fall within the scope of the invention, is the use of one or more of the devices of the invention suitably connected to produce rotational motion. This may be achieved for example by means of a crank.

BRIEF DESCRIPTION OF THE DRAWINGS

The invention is further described by way of example with reference to the accompanying drawings in which:

FIG. 1 is a sectional side view of a device according to the invention,

FIG. 2 is a circuit diagram of the device of FIG. 1 and its control circuit,

FIGS. 3 and 4 illustrate different possible applications of the device of the invention, and FIG. 5 shows part of an arrangement for dislodging residual energy from the device of the invention.

DESCRIPTION OF PREFERRED EMBODIMENT

FIG. 1 illustrates an electrical device according to the invention which comprises two axially aligned and spaced solenoids 10 and 12 respectively, a plunger 14, and a casing 16 of a non-magnetic material.

Each solenoid includes two closely coupled coils 18 and 20 respectively, shown in FIG. 2, which are electrically connected in parallel and arranged so that the magnetic fields of the coil are in the same sense.

The coils are wound, the one around the other, on a coil former consisting of a brass sleeve 22 and an iron sleeve 24.

The coils are magnetically encased by a housing 26 which terminates magnetically in a spigot 28 which extends into the space inside the coil former.

The plunger 14 includes two cores 30 and 32 respectively, interconnected by means of a coupling 34, and a rod 36 which extends through the wall of the casing 16. The coupling and the rod are of a non-magnetic material.

The free end 38 of the rod 36 is adapted for fixing, e.g. by screwing, to a component such as a piston of a pump, or to some other device.

The core 30 is located at least partly inside the solenoid 10 and the core 32 is similarly located inside the solenoid 12.

Leads 40 from the coils 18 and 20 pass through the casing 16.

The coils 18 and 20 are connectable (see FIG. 2) by means of relay contacts 42 to a power supply P. Preferably, power supply P provides direct current to the coils of the solenoid.

A coil 44 of the relay is powered by a source V through a transistor pair 46 which is controlled by means of a timer trigger 48. Any suitable commercially available device or component may be employed as the trigger.

The timer trigger 48 operates to turn the transistor pair 46 on at a given frequency, and for preset intervals. The relay is therefore continuously energized and de-energized. In the former case the solenoid 12 is energized while in the latter case the solenoid 10 is energized. In each instance when one solenoid is energized the other solenoid is de-energized.

With the device in the FIG. 1 position, when the solenoid 10 is energized the core 30 is attracted by the electromagnetic force into the central region of the solenoid, where the flux is at its highest value. The solenoid 12 is then energized, and since the solenoid 10 is de-energized, the plunger is drawn down.

The process continues in this way and the plunger is continuously reciprocated. The rod 36 is thus caused to drive the pump, or if the rod is connected to a crank, rotary movement is produced.

The frequency of the stroke is determined inter alia by the stroke length and by the timer rate. The length of the stroke is determined by the spacing between the two solenoids and by the length of the coupling 34. The timer can be synchronized to the plunger movement, if desired, by controlling the timer with the aid of photoelectric or other suitable electronic or mechanical switches.

The timer, transistor pair and relay can be replaced by a mechanically operated switching mechanism, if desired. For example the plunger 14 can be used to actuate directly mechanically operated switches which are located at specific locations relative to the stroke of the plunger and which control the application of power from the voltage source to the coils to alternately energize them.

Another possibility is the use of a slipring arrangement, which, depending on the application of the electrical device, can be caused to move in synchronism with the plunger either with a reciprocating movement or with rotary movement. In this case brushes engaged with the slipring can be employed to make and break contact with the electrical supply and the coils.

In a device of this nature it is important to optimize the efficiency of the electrical to mechanical power conversion. The applicant achieves this by limiting the stroke length to approximately 20% of the length of each solenoid, thus ensuring that the cores 30 and 32 are always in a high flux region and, in addition, utilizing the cores to provide low reluctance paths for the flux inside the solenoids. Flux leakage from each solenoid is minimized by the use of the encapsulating housing 26. One advantageous modification which the applicant has discovered increases the efficiency of the device involves the shaping of the outer ends respectively of the cores 30 and 32 to a tapered or conical shape, indicated by dotted lines, and the corresponding formation of tapered or conical recesses in the spigots 28, which recesses receive the conical ends, respectively, at the limiting position of each stroke. The precise reason for this improvement is not yet completely clear to the applicant but it appears to be associated with a minimization of flux leakage.

The iron sleeves 24 are located inside the solenoids so that they are out of contact with the cores 30, 32 respectively at the limiting position of the plunger stroke in alternate directions.

Thus the sleeves provide low reluctance paths to the central regions of the solenoid and help to minimize losses.

A particularly important feature from the efficiency point of view is the use in each solenoid of the two coils 18 and 20, connected in parallel to the source P. The two coils are tightly coupled magnetically and thus have a high mutual inductance. The magnetic flux is thereby increased without a corresponding increase in input power. For example the applicant has found with a small model of the device under test conditions that with the use of a single coil in each solenoid a lifting force of 250 gm was obtained. With two coils connected as illustrated in each solenoid, and with the same power consumption, the lifting force was increased to 310 gm.

In accordance with the invention use may be made of more than two coils on each solenoid.

The applicant has also found, through experimentation, that a particularly favourable situation is obtained when the cross sectional areas of the conductors in the coils 18 and 20 are approximately in the ratio of from 7:1 to 9:1, and ideally 8.4:1 with the length of the windings of these coils being in the ratio of from 1:1.5 to 1:3, and preferably 1:2. Either coil may be wound innermost, against the sleeves 22 and 24, with the other coil around the inner coil. However, again through experimentation, the applicant has found that the device efficiency is enhanced when the two windings are wound together, i.e. with the conductors side by side, up to the point where the shorter conductor terminates, from which point the longer conductor is wound around both the already wound conductors.

By suitable design the reciprocation rate can be set at from a few strokes a minute to a few thousand strokes a minute, and the stroke length can be varied over a very wide range.

Losses may also be reduced by laminating the cores 30 and 32.

With the model referred to an efficiency of electrical to mechanical conversion in excess of 60% was achieved.

The possible uses of the device of the invention are manifold, and FIGS. 3 and 4 respectively illustrate two important applications.

In FIG. 3 the device 8, shown in outline only, is directly secured to a piston pump 60. The pump has a housing 62 which is fixed to the casing 16 of the device, a piston 64, one way valves 66 and 68, an inlet 70 and an outlet 72. The rod 36 is coupled to a rod 74 of the piston.

Reciprocating movement of the plunger 14 is thus transferred directly to the piston of the pump, which is reciprocated in the pump housing. The pump itself operates according to substantially conventional principles but the advantages of the combination is that it is compact with no linkages between the pump and the prime mover. Overall efficiency is thereby increased, whilst cost is reduced, and the assembly is well adapted for use as an effective submersible pump.

In FIG. 4 the rod 36 of the device 8 is coupled to a crank 76 mounted on bearings 78 in a housing 80. The reciprocating movement of the device is thereby translated into rotary crank movement. Two or more of the devices 8 operating in conjunction may be connected to the crank 76 to produce continuous smooth rotation. Each rod 36 is coupled to the crank by means of a connecting rod 82.

The problem of coil discharge becomes significant when large power outputs are required of the device. This arises particularly at high operating speeds when the coils are de-energized and the residual energy stored in the coils must be dissipated. If the discharge or release of this energy does not take place in a controlled manner dangerous and damaging sparking occurs as the energy seeks out its own discharge path which can inter alia lead to unacceptable temperature increases in the coils.

One way in which the energy can be dissipated involves the use of free-wheeling diodes. An alternative way, shown in FIGS. 2 and 5, is to connect insulated leads 90 to the coils 18 and 20, at the end, say, of every alternate layer of windings, (see FIG. 5).

The leads 90 are connected to earth to discharge the residual stored energy, when the respective coil is de-energized. FIG. 2 illustrates one way in which this can be done where use is made of auxiliary contacts 92, operated by the relay to connect the leads 90 to earth at the appropriate instant. If use is not made of a relay as a control device to switch the source P to the coils, and a slipring is used in its stead, then the slipring can be used in a similar way to discharge the coils to earth, or multiple sliprings can be used for this purpose. Depending on the quantity of stored energy the leads 90 can be connected through a single lead to earth or, preferably, individually to earth through separate switching devices.

The device shown in FIG. 1 produces straight line reciprocating movement. Clearly the design could be adapted, if desired, so that the plunger 14 moves on an arc to produce reciprocating movement along the arc.

I claim:

1. In an electrical device which comprises at least two solenoid means, plunger means mounted for relative reciprocating movement between the solenoid means, a power supply means and control means for repeatedly and alternately energizing a plurality of the solenoid means with a direct current from said power supply means to produce an electromagnetic field which acts on the plunger means for causing reciprocating movement of the plunger means relative to the solenoid means, wherein said solenoid means includes a former and a set of at least two coils wound on the former, said coils of each of said sets being connected in parallel to each other for simultaneous excitation by said direct current, and wherein the plunger means includes first and second cores, each core being located at least partially in one of the formers, the improvement comprising connecting means in said control means for alternately connecting different sets of said coils to said power supply means and for discharging other sets of said coils in synchronism therewith, and energizing means, wherein said connecting means comprises relay means activated by said energizing means for repeated energization and de-energization and for operating a contact set to provide alternating connection of said power supply means to said sets of coils, said energizing means comprising trigger means for providing a sequence of pulses to a controlled switch means connected between said power supply means and said relay means.

2. The improved device recited in claim 1 wherein said controlled switch means comprises transistor means having output terminals series connected with said relay means and with said power supply means.

3. The improved device recited in claim 2 wherein said transistor means comprises Darlington connected transistors and said trigger means comprises timer circuitry providing said sequence of pulses.

4. In an electrical device which comprises at least two solenoid means, plunger means mounted for relative reciprocating movement between the solenoid means, a power supply means and control means for repeatedly and alternately energizing a plurality of the solenoid means with a direct current from said power supply means to produce an electromagnetic field which acts on the plunger means for causing reciprocating movement of the plunger means relative to the solenoid means, wherein said solenoid means includes a former and a set of at least two coils wound on the former, said coils of each of said sets being connected in parallel to each other for simultaneous excitation by said direct current, and wherein the plunger means includes first and second cores, each core being located at least partially in one of the formers, the improvement comprising connecting means in said control means for alternately connecting different sets of said coils to said power supply means and for discharging other sets of said coils in synchronism therewith, and energizing means, wherein said connecting means comprises relay means activated by said energizing means for repeated energization and de-energization and for operating a contact set to provide alternating connection of said power supply means to said sets of coils, said contact set comprising primary relay contact means operated by said relay means for alternately connecting said power supply means to different sets of said coils and auxiliary relay contact means operated by said relay means for discharging others of said sets of coils when said primary relay contact means connects said different sets of coils to said power supply means.

5. The improved device recited in claim 4 wherein said primary relay contact means comprises a primary movable contact connected to said power supply means and additional contacts connected to said different sets of coils, said auxiliary relay contact means comprises a movable contact connected to a discharge path and movable to different secondary contacts connected to said sets of coils.

6. The improved device recited in claim 5 further comprising insulated leads connected to windings of said sets of coils, wherein said secondary contacts are connected to said insulated leads.

7. The improved device recited in claim 6 wherein said insulated leads are connected to ends of alternate layers of windings of said sets of coils.

8. The improved device recited in claim 5 wherein said coil windings are connected at one end to said primary relay contact means and at the other end to said discharge path.

9. The improved device recited in claim 8 wherein said discharge path is connected to ground.

* * * * *